United States Patent
Patel et al.

(10) Patent No.: US 6,993,225 B2
(45) Date of Patent: Jan. 31, 2006

(54) TAPERED STRUCTURE FOR PROVIDING COUPLING BETWEEN EXTERNAL OPTICAL DEVICE AND PLANAR OPTICAL WAVEGUIDE AND METHOD OF FORMING THE SAME

(75) Inventors: Vipulkumar Kantilal Patel, Monmouth Junction, NJ (US); Prakash Gothoskar, Allentown, PA (US); Robert Keith Montgomery, Easton, PA (US); Margaret Ghiron, Allentown, PA (US)

(73) Assignee: SiOptical, Inc., Allentown, PA (US)

( * ) Notice: Subject to any disclaimer, the term of this patent is extended or adjusted under 35 U.S.C. 154(b) by 63 days.

(21) Appl. No.: 10/775,872

(22) Filed: Feb. 10, 2004

(65) Prior Publication Data

US 2005/0175286 A1 Aug. 11, 2005

(51) Int. Cl.
 *G02B 6/26* (2006.01)
 *H01L 21/02* (2006.01)
(52) U.S. Cl. ............................ 385/43; 385/30; 438/31; 438/40
(58) Field of Classification Search .................. 385/30, 385/43; 65/386; 438/31, 39–40
 See application file for complete search history.

(56) References Cited

U.S. PATENT DOCUMENTS

| | | | |
|---|---|---|---|
| 5,513,288 A * | 4/1996 | Mayer | 385/30 |
| 5,515,464 A * | 5/1996 | Sheem | 385/49 |
| 5,910,012 A * | 6/1999 | Takeuchi | 438/31 |
| 6,090,636 A | 7/2000 | Geusic et al. | |
| 6,316,281 B1 | 11/2001 | Lee et al. | |
| 6,387,720 B1 | 5/2002 | Misheloff et al. | |
| 6,504,977 B1 | 1/2003 | Krishnamoorthy | |
| 6,760,529 B2 * | 7/2004 | Chong et al. | 385/129 |
| 2002/0068396 A1 | 6/2002 | Fitzgerald | |

OTHER PUBLICATIONS

Hiroshi Nishihara, Masamitsu Haruna, Toshiaki Suhara, "Optical Integrated Circuits", McGraw-Hill Book Company, 1989-printed in the United States of America.
P.K. Tien, R. Ulrich, "Theory of Prism-Film Coupler and Thin-Film Light Guides", Journal of the Optical Society of America, vol. 60, No. 10, Oct. 1970.
L.A. Coldren, Y.A. Akulova, E.M. Strzelecka, B.J. Thibealt, J.C. Ko, and D.A. Louderback, "Vesel Array Packaging for Free Space Interconnects" Report 1996-1997 for Micro Project 96-050, Materials and Electrical & Computer Engineering Departments, University of California, Santa Barbara CA 93106.

* cited by examiner

*Primary Examiner*—Akm Enayet Ullah
*Assistant Examiner*—Jerry T Rahll (57) ABSTRACT

Methods of forming a tapered evanescent coupling region for use with a relatively thin silicon optical waveguide formed with, for example, an SOI structure. A tapered evanescent coupling region is formed in a silicon substrate that is used as a coupling substrate, the coupling substrate thereafter joined to the SOI structure. A gray-scale photolithography process is used to define a tapered region in photoresist, the tapered pattern thereafter transferred into the silicon substrate. A material exhibiting a lower refractive index than the silicon optical waveguide layer (e.g., silicon dioxide) is then used to fill the tapered opening in the substrate. Advantageously, conventional silicon processing steps may be used to form coupling facets in the silicon substrate (i.e., angled surfaces, V-grooves) in an appropriate relation to the tapered evanescent coupling region. The coupling facets may be formed contiguous with the tapered evanescent coupling region, or formed through the opposing side of the silicon substrate.

20 Claims, 9 Drawing Sheets

TAPERED STRUCTURE FOR PROVIDING COUPLING BETWEEN EXTERNAL OPTICAL DEVICE AND PLANAR OPTICAL WAVEGUIDE AND METHOD OF FORMING THE SAME

TECHNICAL FIELD

The present invention relates to the formation and utilization of a tapered coupling region between an external optical coupling device (such as a prism) and a planar optical waveguide, such as a waveguide formed in an upper silicon layer of a Silicon-On-Insulator (SOI) wafer structure.

BACKGROUND OF THE INVENTION

It has been recognized for some time that most of the integrated circuit devices, processes and techniques that revolutionized the electronics industry can be adapted to produce optoelectronic integrated circuits. Due to the dominance of silicon as the material of choice for electronic circuits, the use of silicon-based optoelectronic integrated circuit platforms is highly desirable. In many of today's optoelectronic circuit arrangements, a Silicon-On-Insulator (SOI) wafer is utilized as the platform, with one or more silicon waveguides being formed in the upper silicon layer of the SOI structure. These high-index contrast silicon waveguides (with respect to the refractive index value of the insulator material) permit strong light confinement and the use of relatively tight bends in the waveguide topology, as well as the miniaturization of the various electro-optical components used with the silicon waveguides. As the complexity level increases, integration of more functions and components within a single package is required to meet system-level requirements and reduce the associated size and cost of the complete system. A clear advantage of using silicon-based optoelectronic integrated circuits stems from the fact that many required tools, techniques and processes have already been developed in silicon to meet the needs of conventional electronics. In addition, the material costs of silicon-based devices are considerably lower than those for competing technologies, such as gallium arsenide or indium phosphide.

At the present time, it is not possible to monolithically integrate light sources with the remaining components on the opto-electronic platform, since silicon-based lasers and light emitting diodes (LEDs) are only now beginning to be developed. Thus, the light signal must be introduced to the silicon waveguide from an external source.

One conventional prior art arrangement for introducing light into a silicon waveguide is to use a separate laser or LED module emitting a free space beam, followed by optical elements to shape, focus and steer the light beam and/or adjust its polarization state. Alternatively, a fiber-connected light source module can be used, where the coupling termination of the fiber is then followed by similar light coupling components to focus the light signal into the silicon waveguide. While receiving elements may be incorporated in the silicon wafer as on-chip or integrated detectors, there are many applications where the user will need direct access to the optical signal after the on-chip functions have been performed. Thus, it is appropriate to provide an optical output port that would generally be a fiber-based termination, although the preferred embodiments do not exclude other output configurations.

A common prior art technique for coupling light from an external source to a silicon waveguide is to cleave end facets on both the waveguide and the mating fiber termination. Examples of fiber terminations include, but are not limited to, multimode or single-mode fibers with small or zero cleave angles, and specially-shaped or lensed single-mode fibers that produce spot sizes as small as 1.5 $\mu$m. The fiber termination is aligned to allow maximum light transmission through the waveguide, and then fixed in position. Anti-reflection (AR) coatings can be used on both the fiber termination and the waveguide facet to reduce the Fresnel losses. Since input and output ports for devices must be located at edge facets of the waveguide-containing wafer die for this configuration, significant restrictions on device geometry (e.g., topology and/or size) are imposed by using this prior art edge coupling constraint.

The above-described edge coupling technique is effective if the mode-field diameter of the desired mode in the waveguide is similar to the spot size associated with the fiber termination, and if the numerical apertures (NAs) of the fiber termination and waveguide are well-matched. However, in many practical applications, silicon waveguides must be relatively thin, having a thickness of less than 0.35 $\mu$m (with a numerical aperture (NA) essentially equal to 1) to remain single-mode in the vertical direction and enable high-speed electronic applications. By way of comparison, single mode fibers that are commonly used for telecommunications applications have mode field diameters ranging from 2.5–10 $\mu$m, with NAs ranging from 0.1–4.0. Therefore, it is clear that this edge coupling technique is not readily applicable for use with relatively thin, sub-micron dimensioned silicon waveguides.

As direct coupling in the above-described manner does not provide a sufficiently small spot size, alternative techniques to transfer light into a silicon waveguide have been developed. In one prior art technique, light is incident on a periodic grating structure that may be fabricated through conventional lithographic techniques. See, for example, *Fundamentals of Optoelectronics*, Chicago, Richard D. Irwin, Inc., by C. Pollock, 1995, at pages 309–320.

In an alternative prior art technique, an input beam is incident upon an optical element of high-index material that is disposed in very close proximity to the waveguide of interest. One exemplary arrangement of this technique is disclosed in an article entitled "Theory of Prism-Film Coupler and Thin-Film Light Guides", by P. K. Tien et al., appearing in the *Journal of the Optical Society of America*, Vol. 60, 1970, at pages 1325–1337. In this context, "very close proximity" is intended to mean that the separation distance between the optical element and the waveguide permits evanescent coupling of light from the optical element to the waveguide. In order for evanescent coupling to occur, the medium separating the optical element from the waveguide must have a refractive index that is lower than those associated with the optical element and waveguide materials. In addition, the refractive index of the launch optical element must equal or exceed that of the waveguide material. In order to couple light efficiently from the optical element to the waveguide for a specified wavelength and waveguide thickness, light must be incident on the waveguide at a specific angle of incidence. To readily achieve the required angle of incidence, the optical element is frequently fabricated in the form of a prism. By varying the angle of incidence of the external beam on the angled facet of the prism, the beam inside the prism can be refracted at the desired angle. For this reason, the evanescent technique is generally referred to in the art as "prism coupling".

Figure 1:
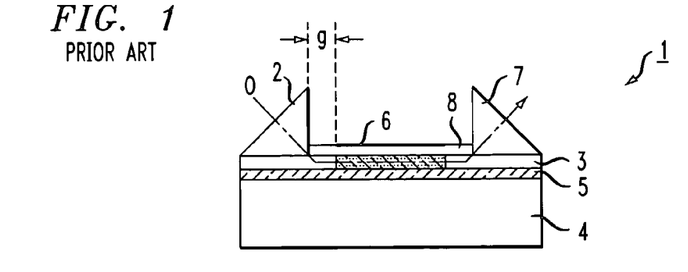
FIG. 1 illustrates an exemplary prior art prism coupling arrangement.

FIG. 1 illustrates one such exemplary prior art prism coupling arrangement, wherein in particular FIG. 1 illustrates an exemplary optical waveguide device 1 such as disclosed and claimed in U.S. Pat. No. 6,526,187, issued on Feb. 25, 2003 and assigned to the same assignee as the present application. Referring to FIG. 1, an optical signal O passes through an input prism 2 and is thereafter coupled into a silicon optical waveguide layer 3, layer 3 being the upper silicon layer of a Silicon-On-Insulator (SOI) structure including a silicon substrate 4 and a buried oxide layer 5, layer 5 disposed between upper silicon waveguide layer 3 and silicon substrate 4, with layer 5 exhibiting a lower refractive index than silicon layers 3 and 4. A "gate" electrode 6 is disposed to cover the guided region above waveguide 3 between input prism 2 and an output prism 7. An upper insulating layer 8 (also referred to as the "gate oxide" and exhibiting a relatively low refractive index) is disposed between gate electrode 6 and waveguide layer 3, and is used to maintain light guiding within waveguide layer 3. It has been found that as a voltage potential is applied to gate electrode 6, the distribution of free carriers (either holes or electrons) near the boundary between waveguide layer 3 and gate oxide 8 changes, actuating an optical action in waveguide layer 3 sufficient to support propagation of an optical signal (the distribution change illustrated by the shaded region in FIG. 1). The position and physical properties of prisms 2 and 7 are utilized to couple the light signal into and out of waveguide 3.

It has been found, however, that the prisms are suboptimal in terms of the amount of light actually coupled into the waveguide when the evanescent coupling region has a substantially constant thickness. Additionally, the quality of the prism edge has been found to be directly related to the uniformity (or lack of uniformity) in the coupled signal.

A known method of addressing this prism-to-waveguide coupling problem is to utilize a layer (that is, an evanescent coupling layer) of graded thickness between the prism exit surface and the entry point of the waveguide. By grading the thickness of the evanescent coupling layer, the shape of the output beam can be modified to improve the coupling into the silicon waveguide layer. To date, however, there are no known manufacturing methods or processes of producing precision input/output wafer structures with tapered evanescent coupling regions. Any such process requires a precise set of geometrical constraints on the coupling region, waveguide and prism coupling structure.

Thus, a need remains in the art for a robust method for providing a tapered evanescent coupling region that may be used to improve the coupling efficiency between an optical coupling prism (or any other external device) and an optical waveguide formed in an upper silicon layer of an SOI structure.

SUMMARY OF THE INVENTION

The need remaining in the prior art is addressed by the present invention, which relates to the formation and utilization of a tapered coupling region between an external optical coupling device (such as a prism) and a planar optical waveguide, such as a waveguide formed in an upper silicon layer of a Silicon-On-Insulator (SOI) wafer structure.

In accordance with the present invention, the formation of a tapered evanescent coupling region is based on using gray-scale lithography to obtain the controlled slope and dimensional accuracy required for forming the desired tapered region for providing efficient coupling between external optics and a relatively thin silicon optical waveguide layer in an SOI wafer.

Various embodiments of the present invention illustratively form both coupling optics and the tapered evanescent coupling region in the same substrate. In certain embodiments, a tapered region of low refractive index material (e.g., an oxide) is formed along a first major surface of a silicon substrate, with the opposing major surface processed using masks and etching techniques to form angled surfaces appropriate for coupling a free space optical signal into the evanescent coupling region. Advantageously, cavity regions may also be formed in the coupling substrate to prevent the premature re-entry of light from the optical waveguide into the coupling substrate.

In alternative embodiments, the coupling surfaces and tapered evanescent coupling region are formed on the same major surface of an optical substrate, leaving the opposing substrate free for formation of other useful optical components (e.g., transmissive and/or reflective optical components).

While the present invention, as described hereinbelow, is directed to the construction and utilization of a silicon-based wafer containing a tapered evanescent coupling region as particularly used with an SOI wafer, it is to be understood that similar silicon-based devices in die or wafer form can be attached in the same manner to wafers that include waveguides formed from any material that has a lower refractive index than silicon. Some exemplary waveguide materials include, but are not limited to, indium phosphide (refractive index of approximately 3.2 at a wavelength of 1550 nm) and lithium niobate (refractive index of approximately 2.1–2.2 at a wavelength of 1550 nm). While such device wafers cannot be manufactured with standard silicon processing techniques or features, applications for these wafers may still benefit from the inventive tapered coupling region processing and attachment technique.

BRIEF DESCRIPTION OF THE DRAWINGS

Referring now to the drawings, where like numerals represent like parts in several views.

DETAILED DESCRIPTION

Figure 2:
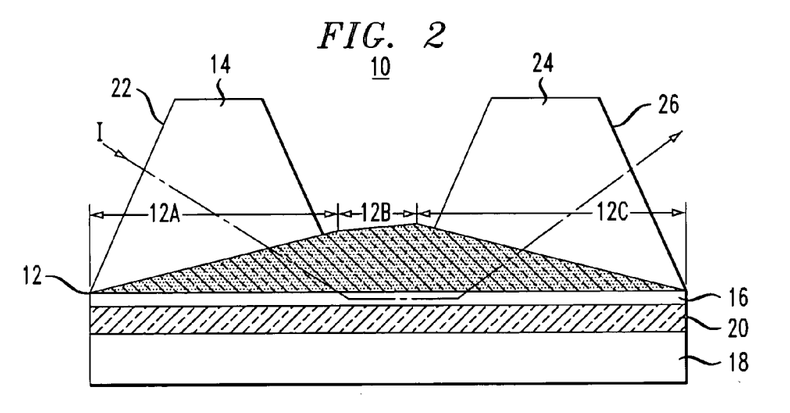
FIG. 2 shows, in a cut-away partial view, an exemplary arrangement utilizing a tapered evanescent coupling region formed in accordance with the present invention.

FIG. 2 illustrates, in a cut-away partial view, an exemplary arrangement 10 of the present invention utilizing a tapered evanescent coupling region 12 disposed between an external optical coupling element 14 (in this case, a prism) and a relatively thin silicon optical waveguide layer 16. In the particular embodiment of FIG. 2, silicon waveguide layer 16 is formed as part of an SOI structure, the SOI structure further comprising a silicon substrate 18 and buried oxide layer 20. As shown in FIG. 2, buried oxide layer 20 is disposed between the relatively thin upper silicon optical waveguide layer 16 and silicon substrate 18. In the utilization of arrangement 10, a light beam I is introduced from an external source (not shown) and impinges an input coupling facet 22 of input prism 14. The light beam is thereafter refracted at the proper angle through prism 14, passes through tapered evanescent coupling region 12 and enters silicon optical waveguide layer 16.

In order for evanescent coupling to occur, tapered evanescent coupling region 12 separating prism 14 from silicon optical waveguide layer 16 must have a refractive index that is lower than those associated with either prism 14 or waveguide layer 16. Additionally, the refractive index of input coupling prism 14 must equal or exceed the refractive index of silicon optical waveguide layer 16. In order to efficiently couple light from prism 14 to waveguide layer 16 for a specific input light beam wavelength and thickness of waveguide layer 16, the light beam must be incident on waveguide layer 16 at a specific angle of incidence. Thus, a prism is often used as the input coupling device so as to achieve this particular angle. By varying the angle of incidence of the external beam on angled facet 22 of prism 14, the beam inside prism 14 can be refracted at the desired angle. The use of tapered evanescent coupling region 12 has been found to improve the coupling efficiency as compared with an evanescent coupling region of substantially constant thickness. Advantageously, the use of a tapered coupling region eliminates the requirement of exact gap spacing, as well as eliminating the need for making a high quality edge on an inner surface of prism 14 to truncate the beam.

As will be discussed in detail below, the thickness of tapered coupling region 12 increases along a first section 12A, associated with the location at which the input beam is coupled through prism 14 and passes through coupling region 12 into waveguide layer 16. The middle section of tapered coupling region 12, denoted as 12B, maintains a thickness large enough to avoid the coupling of light from the underlying silicon waveguide layer 16 back into prism 14. The third section of tapered coupling region 12, denoted as 12C, is formed in accordance with the present invention to exhibit a decreasing taper, thus allowing the optical signal propagating along waveguide layer 16 to be evanescently coupled through section 12C and into an output coupling prism 24, exiting along an output facet 26 of output coupling prism 24.

Figure 3:
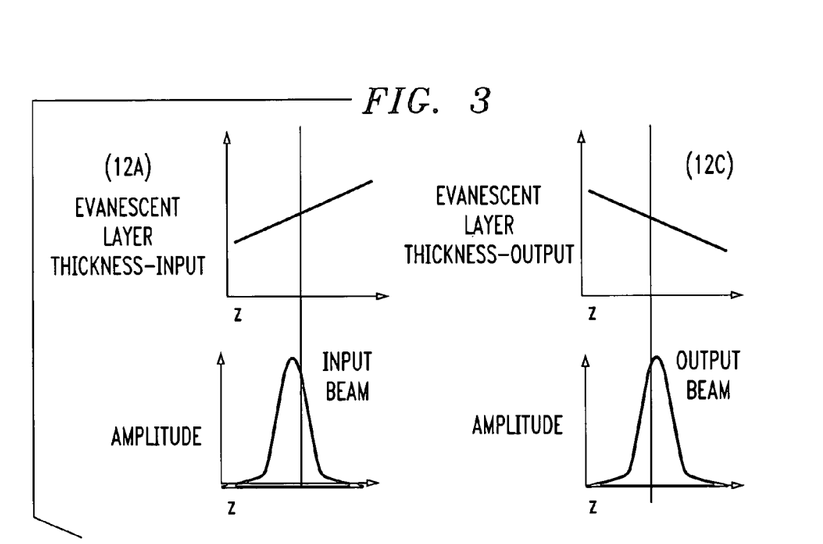
FIG. 3 contains both diagrams illustrating exemplary evanescent coupling layer thickness profiles and the accompanying beam profiles for an optical signal passing therethrough.

FIG. 3 contains exemplary evanescent coupling layer thickness profiles for sections 12A and 12C, and illustrates exemplary beam profiles associated with these tapered input (12A) and output (12C) regions of evanescent coupling layer 12. In particular, if the output beam profile is to be closely matched to the input beam profile, the first light exiting from output prism 24 should be fairly weakly coupled, so that most of light remains in waveguide layer 16. To ensure that this occurs, the thickness of evanescent coupling layer 12C should be well above the value required for optimum coupling. After this point, the coupling strength seen by the light needs to increase so that the majority of the light can be extracted from the peak of the "Gaussian-like" output beam. Thus, this portion of the beam must sample the interface where evanescent coupling layer 12 is close to the optimal thickness. The majority of the energy is therefore transferred from waveguide layer 16, as shown by the beam profile in FIG. 3, and exits the system through output facet 26 of output coupling prism 24. Although the coupling strength continues to increase with the decreasing thickness of evanescent coupling layer 12, the amount of light exiting through output prism 24 starts to decrease as the light in waveguide layer 16 drops to lower and lower levels. In this manner, a more Gaussian-like profile for the output beam is achieved, as shown in FIG. 3. The optimum location of input and output beam coupling, with respect to the thickness of evanescent layer thickness, is illustrated by the vertical line through the input and output beam profiles.

In accordance with the present invention, the formation of a tapered coupling region is based on using gray-scale lithography to obtain the controlled slope and dimensional accuracy required for forming the desired tapered evanescent coupling region. FIGS. 4–10 illustrate a first process of the present invention used to form a tapered evanescent coupling region to facilitate light coupling between external coupling elements (e.g., prism couplers) and a relatively thin silicon optical waveguide layer formed within an SOI structure. In this particular inventive process, as will be discussed below, the tapered coupling region is formed as part of the prism coupler. An alternative embodiment, wherein joining of the tapered evanescent coupling region to the waveguide in the SOI wafer will be discussed hereinafter.

Figure 4:
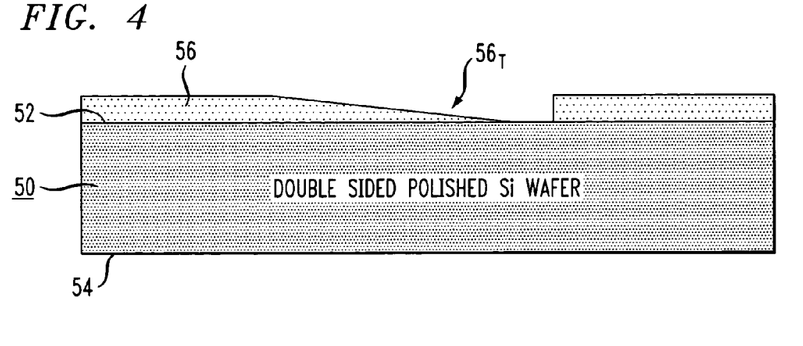
FIGS. 4–10 illustrate a first sequence of processing steps used to form the exemplary arrangement of FIG. 2, particularly illustrating the formation of a tapered evanescent coupling region and pyramidal optical coupling facets.

Referring now to the inventive process where the tapered evanescent coupling region is formed as part of the external prism coupler, FIG. 4 illustrates an initial step in the fabrication process, which comprises the selection of a silicon substrate 50 as the material for the final prism structure. In accordance with the present invention, silicon substrate 50 is chosen to have a dopant species and concentration such that the refractive index of the final prism wafer is at least equal to that of the silicon optical waveguide in the final structure (see FIG. 10 for a depiction of the silicon optical waveguide). The thickness of substrate 50 is selected to provide for fabrication of a prism coupler with a desired height. Advantageously, a specific prism design based on industry standard wafer thickness (i.e., 625 $\mu$m±25 $\mu$m for a typical six-inch diameter wafer), will result in significant cost reduction. In processing, substrate 50 should be oriented along the <100> crystal plane for a final prism structure exhibiting a facet angled at 54.7°, using a conventional anisotropic wet etch process, as will be described below.

Referring back to FIG. 4, substrate 50 is subjected to a double polishing process such that its top major surface 52 and bottom major surface 54 are both pristine and smooth. Following the polishing operation, a relatively thin photosensitive layer 56 is deposited over top major surface 52 of substrate 50. Commercially available photoresist materials used in the semiconductor industry are exemplary materials that may be used for this process. Subsequent to the deposition of photoresist layer 56, layer 56 is exposed using a gray-scale lithography mask and then developed using conventional chemicals used in photoresist processing.

Gray-scale lithography utilizes locally modulated exposure doses to multiple depths of the exposed photoresist (or any other photosensitive material) across the substrate surface. This is due to ultraviolet light being absorbed by the photoactive compound as it travels through the depth of the photoresist, where the thickness of the spatial photoresist after development will depend upon the local dose of the UV radiation. The local dose is then adjusted to take into account the nonlinear photo-response of the particular photoresist, as well as proximity effects. The development time and conditions are also carefully controlled to achieve the desired "analog" photoresist profile. It should be noted that gray-scale lithography is considered as a "batch" process, and offers a cost-effective solution for many applications. Other methods of forming tapered photoresist region $56_T$ may be used in the process of the present invention, such as laser beam direct-Write lithography or e-beam direct-write lithography, both well-known practices in the semiconductor processing art, albeit more expensive and time-consuming than the batch capabilities of gray-scale photolithography.

Figure 5:
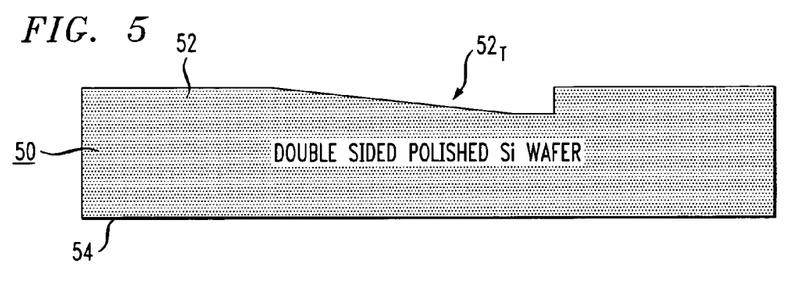

Once tapered profile $56_T$ has been formed in resist layer 56, the next step is to transfer this profile into underlying silicon substrate 50. FIG. 5 illustrates substrate 50 at the completion of this process, where top major surface 52 of substrate 50 has been processed to include a tapered region $52_T$. One exemplary method that may be used to transfer the desired evanescent coupling region profile into substrate 50 is to etch resist layer 56 with an etchant(s) appropriate to transfer the exact profile of the taper, that is an etchant that exhibits the same removal rate for the resist material and for silicon (the substrate material). That is, by using an etchant that exhibits a 1/1 ratio of the "etch rate of resist"/"etch rate of silicon", the etching process will create an identical reverse tapered shape within top major surface 52 of silicon substrate 50. Alternatively, for a 5:1 ratio of etch rates, the removal process will create features that are approximately five times shallower in the silicon surface as compared with the original pattern formed in the photoresist surface. Thus, the proper sizing of the photoresist taper pattern and choice of etchant(s) are both under control of the individual using the process of the present invention to obtain a tapered region with the desired physical dimensions. Additional wet chemical processes or oxidation processes can also be used at this point to polish the surfaces of tapered silicon region $52_T$. Various processes that may be used in the above-mentioned process steps include, but are not limited to, plasma etching, reactive ion etching and ion milling.

Figure 6:
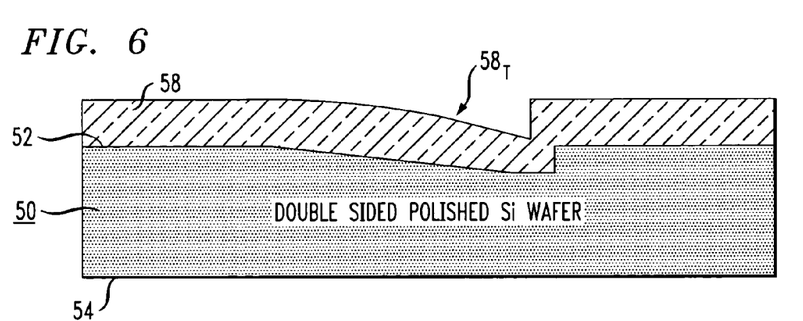
Figure 7:
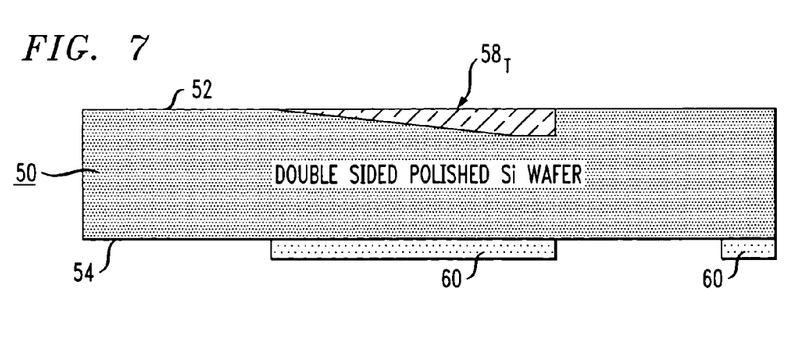

FIG. 6 illustrates the next step in the fabrication process, which is related to "filling" tapered silicon region $52_T$ with the material chosen for use as the evanescent coupling region. As discussed above, the material used for the evanescent coupling region must exhibit a refractive index that is less than that of the underlying silicon optical waveguide in the final device structure (see FIG. 10). Referring to FIG. 6, a relatively simple oxidation process can be applied to etched substrate 50 so as form an oxide layer 58 that will "fill" tapered region $52_T$ so as to form a dielectric tapered region $58_T$, as well as cover the remaining top major surface 52 of silicon substrate 50 (the oxide having a lower refractive index than silicon). Other processes and materials that may be used for this step include, for example, chemical vapor deposition (CVD), plasma-assisted vapor deposition (VAD), or physical vapor deposition (PVD) of various oxide, nitride or carbide materials (hereinafter referred to generally as a "dielectric"). A polishing process, such as chemical-mechanical polishing (CMP) can then be used to remove all of the dielectric material outside of filled tapered region $58_T$, resulting in the structure as shown in FIG. 7.

Figure 8:
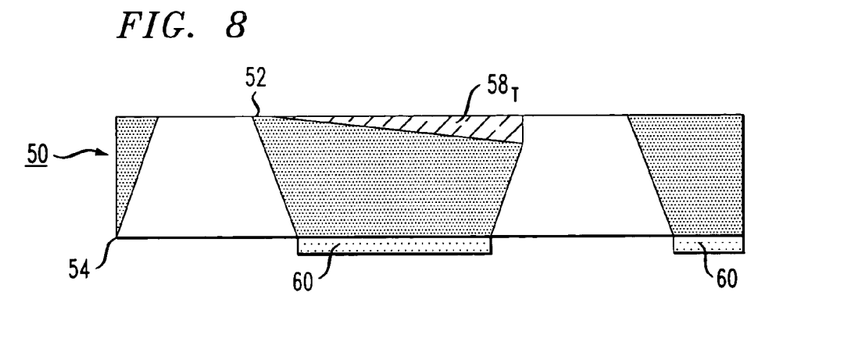

Once tapered evanescent coupling region $58_T$ has been formed, silicon substrate 50 is further processed to form the required prism coupling structure. A first step in an exemplary process of forming the desired prism coupler requires the formation of a patterned etch layer 60 on bottom major surface 54 of substrate 50, as shown in FIG. 7. A wet chemical etching process can then be used to complete etch through silicon substrate 50, forming angled surfaces as shown in FIG. 8. For example, with a <100>-oriented wafer, as discussed above, wet etching processes utilizing KOH or TMAH can form the desired angled surfaces. Alternatively, a reactive ion etch (RIE) process can be used to form the desired surfaces, including corner structures that aid in signal coupling, and/or cavity regions.

Figure 9:
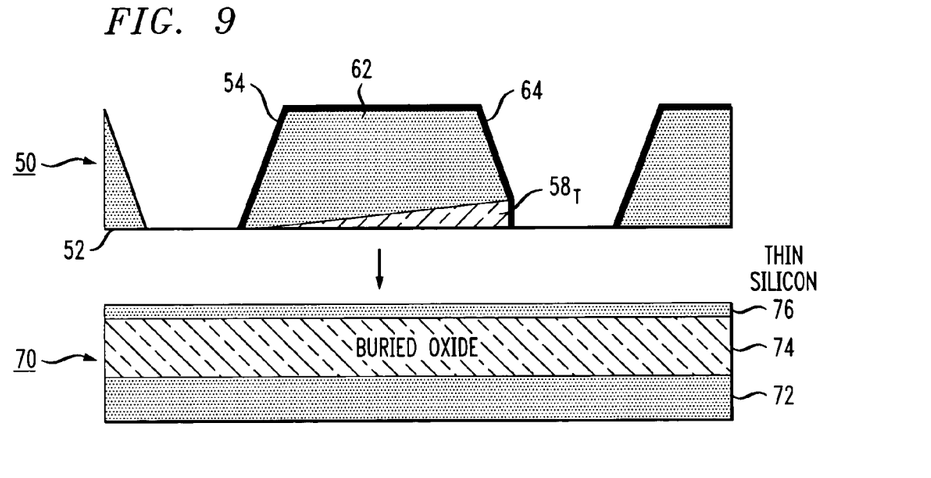

FIG. 9 illustrates the next step in the process, where substrate 50 is rotated such that top major surface 52 is disposed underneath bottom major surface 54. It is clearly seen in this rotated view that the etching step of FIG. 8 has resulted in the formation of an input prism coupler 62 that advantageously includes a tapered evanescent coupling region $58_T$, in accordance with the present invention. To further enhance the optical qualities of input prism coupler 62, a layer of anti-reflective material 64, such as silicon nitride, may be formed to cover the exposed surfaces of input prism coupler 62.

Figure 10:
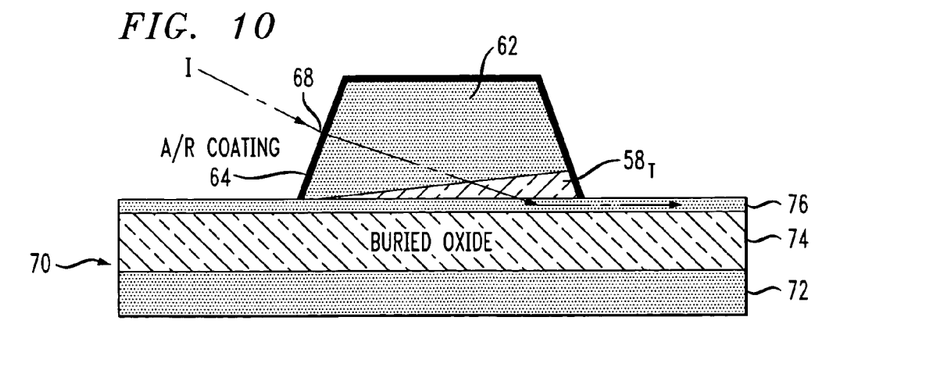

Once tapered region $58_T$ and input prism coupler 62 have been formed, substrate 50 may be joined to a second substrate, such as an SOI wafer 70 illustrated in FIG. 9, where SOI wafer 70 has been processed to comprise a silicon substrate 72, buried oxide layer 74 and a relatively thin silicon optical waveguide layer 76. In accordance with the present invention, substrate 50 is joined to SOI wafer 70 such that tapered evanescent coupling region $58_T$ contacts relatively thin silicon optical waveguide layer 76. FIG. 10 illustrates the final structure, where an input optical signal O will pass through input facet 68 of input prism coupler 64 (the angled surface of facet 68 being properly formed through the wet chemical etch process discussed above in association with FIG. 8) and enter tapered evanescent coupling region $58_T$. As discussed in association with FIGS. 2 and 3, an ever-increasing amount of input optical signal O will be coupled out of coupling region $58_T$ and into silicon optical waveguide layer 16, thus allowing for the efficient coupling of an external light beam into a relatively thin (for example, sub-micron) silicon optical waveguide layer as formed in an SOI structure.

Figure 11:
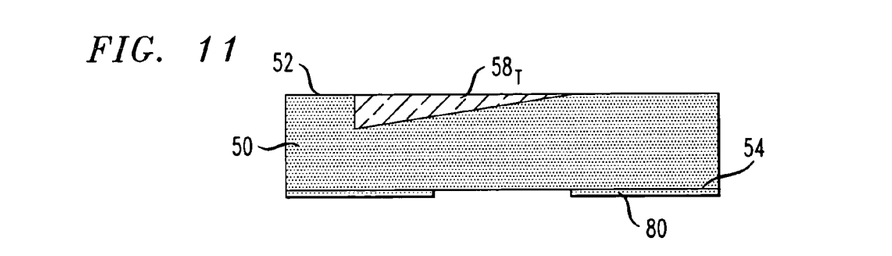
FIGS. 11–15 illustrate an alternative set of processing steps, used to form a tapered evanescent coupling region and associate V-groove optical coupling structure.
Figure 12:
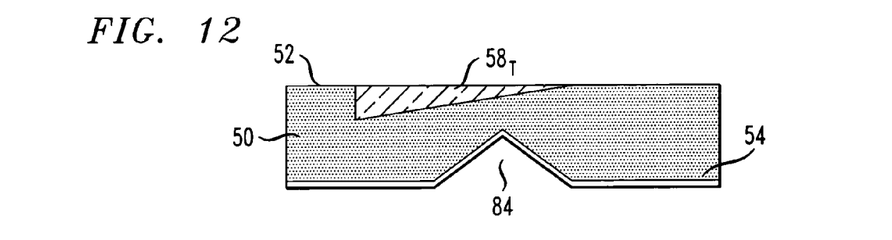

FIGS. 11–15 illustrate a set of processing steps associated with an alternative embodiment of the present invention, utilizing a V-groove structure formed in opposition to a tapered evanescent coupling region to provide coupling from an external signal source into the tapered evanescent coupling region. In this embodiment, the same processing steps as illustrated in FIGS. 4–7 are used to form tapered evanescent coupling region $58_T$ in coupling substrate 50. In this embodiment, in contrast, a V-groove coupling element is then formed, as illustrated in the following figures. With reference to FIG. 11, a patterned mask layer 80 is formed across bottom major surface 54 of substrate 50, delineating an opening 82 through which a V-groove (used for coupling) will be formed. In accordance with the present invention, the location of opening 82 is carefully chosen to align with tapered evanescent coupling region $58_T$ so that an optical signal passing through the formed V-groove will intercept tapered evanescent coupling region $58_T$ at the proper location. In particular, the V-groove-type input/output coupling surfaces are formed by performing an anisotropic wet chemical etch on bottom major surface 54 of substrate 50, resulting in the structure as illustrated in FIG. 12, which contains an exemplary V-groove 84. An AR coating 86 may then be formed to completely cover bottom major surface 54 and V-groove 84.

Figure 13:
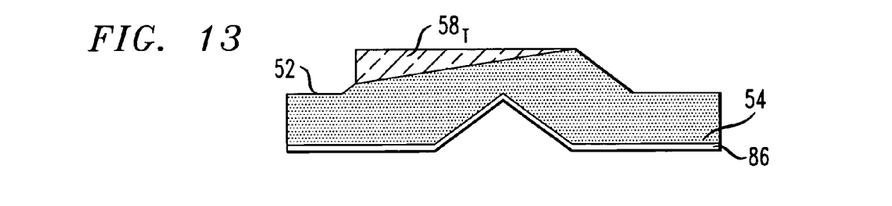
Figure 14:
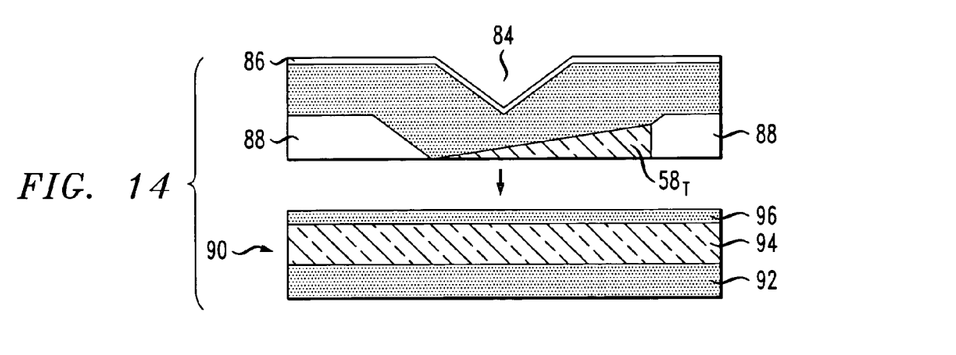
Figure 15:
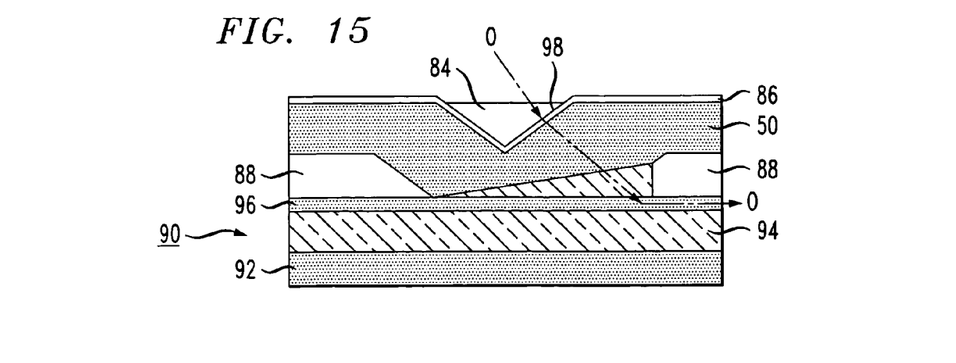

The next step in this process embodiment is illustrated in FIG. 13, where tapered evanescent coupling region 58$_T$ is used as an etch mask and top major surface 52 of substrate 50 is etched to form cavity regions 88. Alternatively, a lithography-based mask can be used to define cavity region (s) 88. Cavity region 88 is utilized, as illustrated below, to prohibit coupling of light from an SOI waveguide layer to the input/output coupling device in unwanted regions, as well as to allow for physical clearance for high topology areas on an associated SOI wafer. Indeed, subsequent to the formation of cavity regions 88, substrate 50 is rotated and joined to an SOI wafer 90, wafer 90 comprising a silicon substrate 92, a buried oxide layer 94 and a relatively thin silicon optical waveguide layer 96. FIG. 14 illustrates, in an exploded view, the joining of coupling substrate 50 to SOI wafer 90, where FIG. 15 illustrates the final structure. As shown in FIG. 15, an input optical signal from an external source (not shown) will impinge an angled surface 98 of V-groove 84, angled surface 98 thus functioning as an input facet. The optical signal thereafter passes through substrate 50 and enters tapered evanescent coupling region 58$_T$, where as before tapered evanescent coupling region 58$_T$ functions to efficiently couple the optical signal into silicon optical waveguide layer 96 of SOI wafer 90. The presence of cavity region 88, in accordance with the present invention, is disposed above the portion of silicon optical waveguide layer 96 supporting the propagation of an optical signal so as to prevent the coupling of the optical signal back into coupling substrate 50 (since the refractive index of air is greater than that of silicon).

Figure 16:
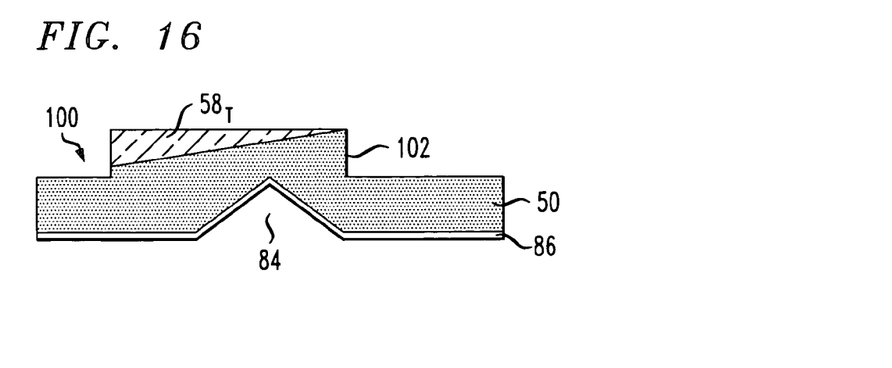
Figure 17:
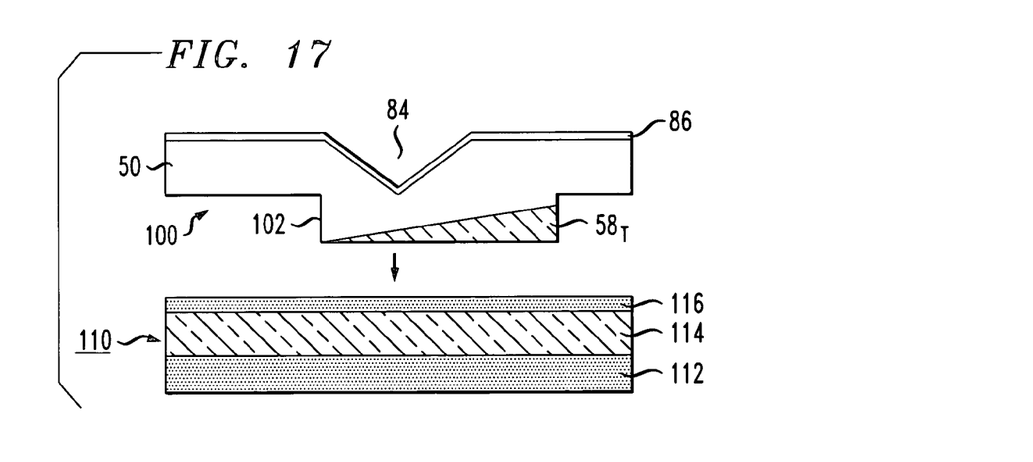
Figure 18:
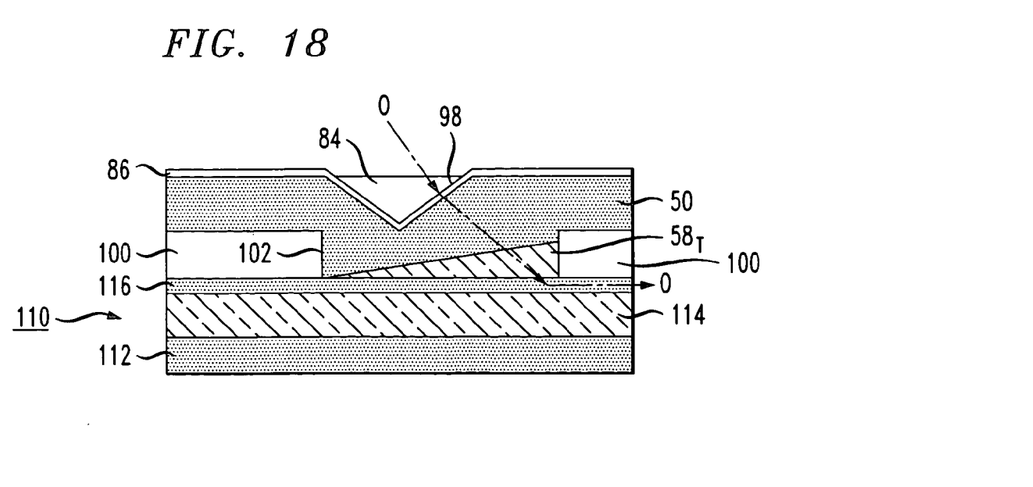

The cavity regions in coupling substrate 50 may be formed using other processes, such as reactive ion etching (RIE), plasma etching, ion milling, or any other suitable silicon removal technique. In particular, FIG. 16 illustrates an alternative process step (in comparison with FIG. 13) where reactive ion etching is used to form cavity regions 100 in coupling substrate 50. In comparison to the wet chemical process used to form the arrangement of FIG. 13, sidewalls 102 of cavity regions 100 in the embodiment of FIG. 16 are essentially vertical, as compared to the angled sidewalls of cavity regions 88 in FIG. 13. Following the formation of cavity regions 100 in coupling substrate 50, substrate 50 is joined to an exemplary SOI wafer 110 including a silicon substrate 112, buried oxide layer 114 and silicon optical waveguide layer 116, as shown in FIG. 17. As with the other embodiments discussed above, coupling substrate 50 is inverted prior to joining such that tapered evanescent coupling region 58$_T$ and cavity region 100 are properly disposed over and coupled to silicon optical waveguide layer 116. FIG. 18 illustrates the joined structure formed in accordance with this embodiment of the present invention, illustrating the propagation of an external optical signal O through input facet 98 of V-groove 84 of coupling substrate 50 and into tapered evanescent coupling region 58$_T$. Thereafter, the optical signal O is evanescently coupled into silicon optical waveguide layer 116, where the presence of RIE-formed cavity region 100 prevents any of the optical signal from coupling back into coupling substrate 50 (since the refractive index of the air within cavity region 100 is greater than the refractive index of silicon substrate 50).

Each of the various tapered evanescent coupling region fabrication processes of the present invention described thus far require the processing of both sides of the coupling substrate (e.g., substrate 50) to form the required input/output coupling facets and the tapered evanescent coupling region. Alternative processes of the present invention, as described below, have been developed where both the coupling facet and the tapered evanescent coupling region are formed within the same major surface of the coupling substrate. Additionally, such a process allows for the remaining major surface to be continuous and without major topological features. Such an embodiment is considered to be a major advantage for performing conventional, gray-scale or nano-imprint photolithographic pattern transfer techniques in combination with the etch processes that are commonly used in the fabrication of silicon-based micro-optical components, where various ones of these micro-optical components can thus be formed on this un-used wafer surface. Indeed, several micro-optical components, such as lenses, gratings, mirrors and sub-wavelength diffractive optical elements can be realized in precise locations in the optical path on this major surface to allow for many additional optical functions, such as beam focusing, wavelength separation, beam shaping, beam deflection, etc.

Figure 19:
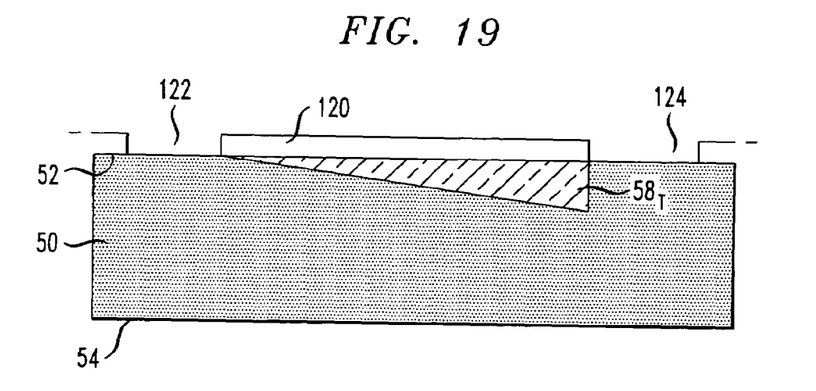
FIGS. 19–23 illustrate yet another set of processing steps of the present invention, in this case for forming both a tapered evanescent coupling region and optical coupling facet through the same major surface of a silicon substrate.
Figure 20:
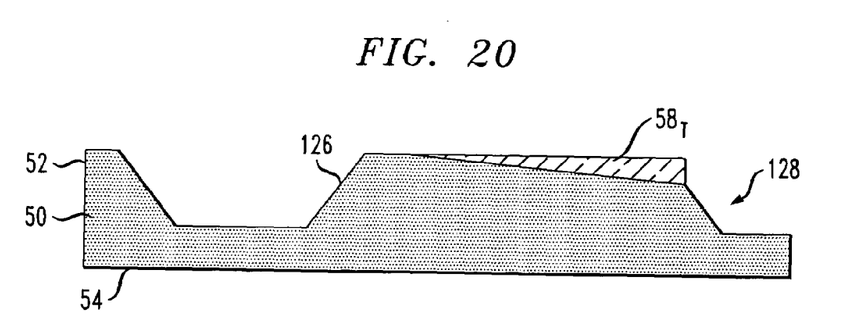

FIGS. 19–23 illustrate an exemplary process of the present invention that may be used to form both an optical coupling surface and tapered evanescent coupling region through the same major surface of an optical coupling substrate. Referring to FIG. 19, optical coupling substrate 50, as described above, is illustrated with tapered evanescent coupling region 58$_T$ formed as described above in FIGS. 4–7. In this particular process of the present invention, subsequent to the formation of tapered evanescent coupling region 58$_T$, a patterned etch mask 120 is disposed over top major surface 52 of coupling substrate 50 so as to protect tapered evanescent coupling region 58$_T$ and expose a first portion 122 of top major surface 52 where an optical coupling surface is to be formed. Advantageously, mask 120 may be patterned to delineate a second portion 124 of top major surface 52 where a cavity region (for blocking an optical signal) can be formed. In a preferred process, a wet chemical anisotropic etch is used to remove the substrate material, thus forming the structure as illustrated in FIG. 20. In one exemplary process, a silicon wafer with a <100> crystal plane orientation is used to form optical coupling substrate 50, such that with a KOH-type conventional wet chemical etch, surfaces at an angle of 54.7° are formed with respect to surface 52. Alternatively, other angles may be achieved by selecting silicon wafers with a different crystallographic orientation. Gray-scale lithography and etching can also be used to form input/output coupling facets at a desired angle in silicon wafers with these different orientations.

In particular, FIG. 20 illustrates optical coupling substrate 50 including tapered evanescent coupling region 58$_T$ and a pyramidal opening formed from the wet chemical etch process to provide an angled optical reflecting surface 126, where in this example surface 126 forms an angle of 54.7° with respect to top major surface 52. In accordance with the present invention and as illustrated in the following diagrams, angled reflecting surface 126 is used for re-directing an optical input signal into tapered evanescent coupling region 58$_T$. Advantageously, a cavity region 128 may also formed in the structure during the same wet chemical etch process, as shown in FIG. 20, that will be used to aid in maintaining the propagation of an optical signal in a silicon optical waveguide layer, as discussed below.

Figure 21:
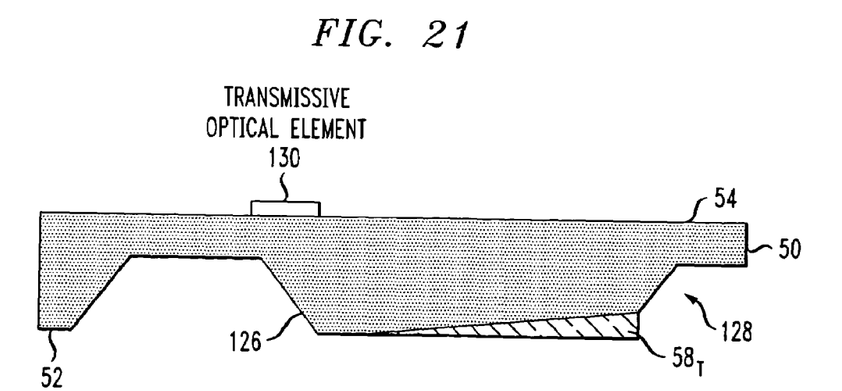

Subsequent to the wet chemical etching process, a transmissive optical element 130 (such as, for example, a lens or diffractive optical element) may be disposed at a predefined location on "bottom" major surface 54 of substrate 50, as shown in FIG. 21. In particular, optical coupling substrate 50 is re-oriented such that "top" major surface 52, including both tapered evanescent coupling region $58_T$ and optical reflecting surface 126 is disposed underneath "bottom" major surface 54. As discussed above, an advantage of this particular configuration of the present invention is that the required coupling components are all formed through the same major surface (surface 52), allowing the remaining major surface (surface 54) to be used for supporting other system elements, or alternatively, to maintain a planar geometry to facilitate further processing.

Figure 22:
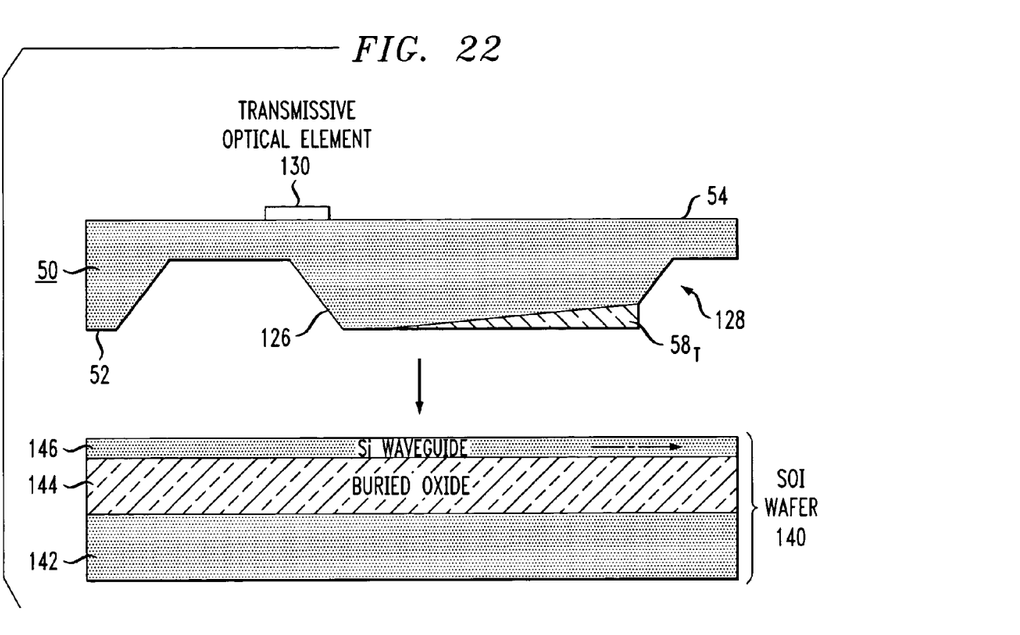
Figure 23:
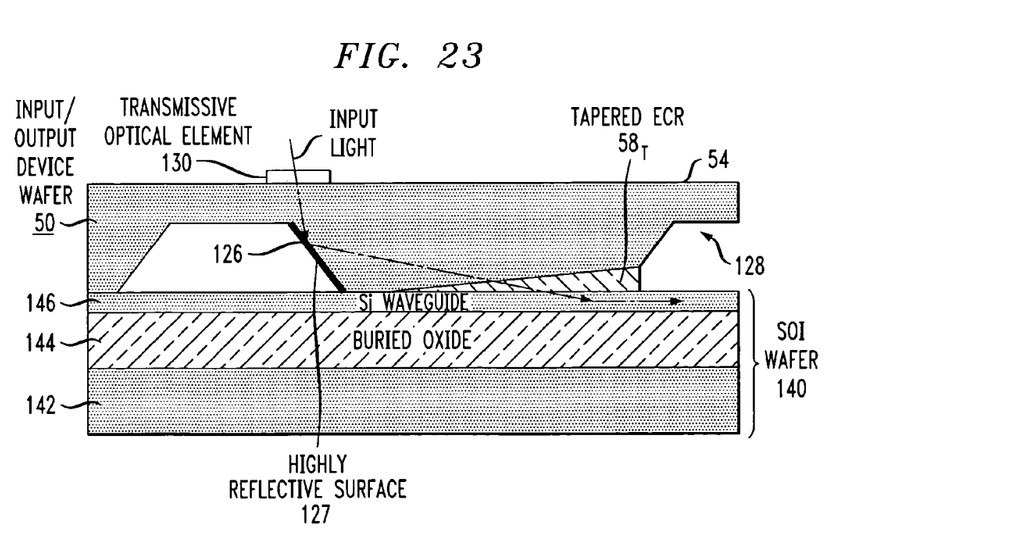

FIG. 22 illustrates the next step in this embodiment of the present invention where optical coupling substrate 50, including transmissive optical element 130 is coupled to an SOI wafer 140 comprising a silicon substrate 142, a buried oxide layer 144 and a surface silicon optical waveguide layer 146. Referring to FIG. 22, optical coupling substrate 50 is disposed over and joined to silicon optical waveguide layer 146 of SOI wafer 140. FIG. 23 illustrates the final arrangement formed using this inventive process. As shown, an optical input signal passes through transmissive optical element 130 and is thereafter focused onto surface 126. By virtue of the different refractive index values between silicon substrate 50 and the low index region surrounding surface 126 (in this case, "air"), the optical signal will reflect off of surface 126, and thereafter be directed into tapered evanescent coupling region $58_T$. If desired, an additional optical reflective coating 127 may be formed on the exposed region of surface 126 to improve the reflection efficiency of this embodiment. As with the other embodiments of the present invention, the optical signal present in tapered evanescent coupling region $58_T$ will then be coupled into optical waveguide layer 146 and propagate therealong. As shown in FIG. 23, the presence of cavity region 128 above optical waveguide layer 146 will block the re-entry of the optical signal into substrate 50 and aid in maintaining the propagation of the signal along waveguide 146.

Figure 24:
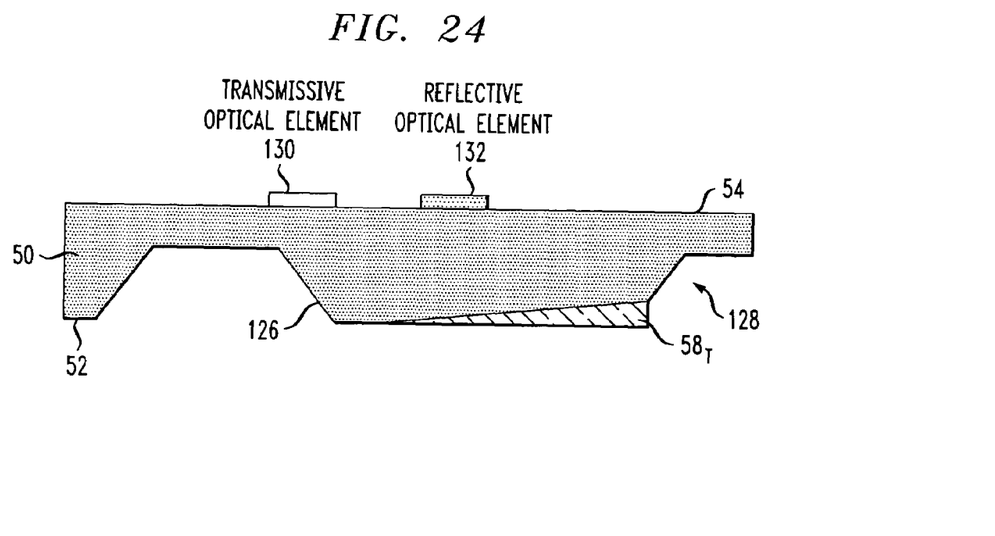
FIGS. 24 and 25 illustrate an alternative to the process illustrated in FIGS. 19–23 where an additional reflective optical element is disposed on the opposing major surface.
Figure 25:
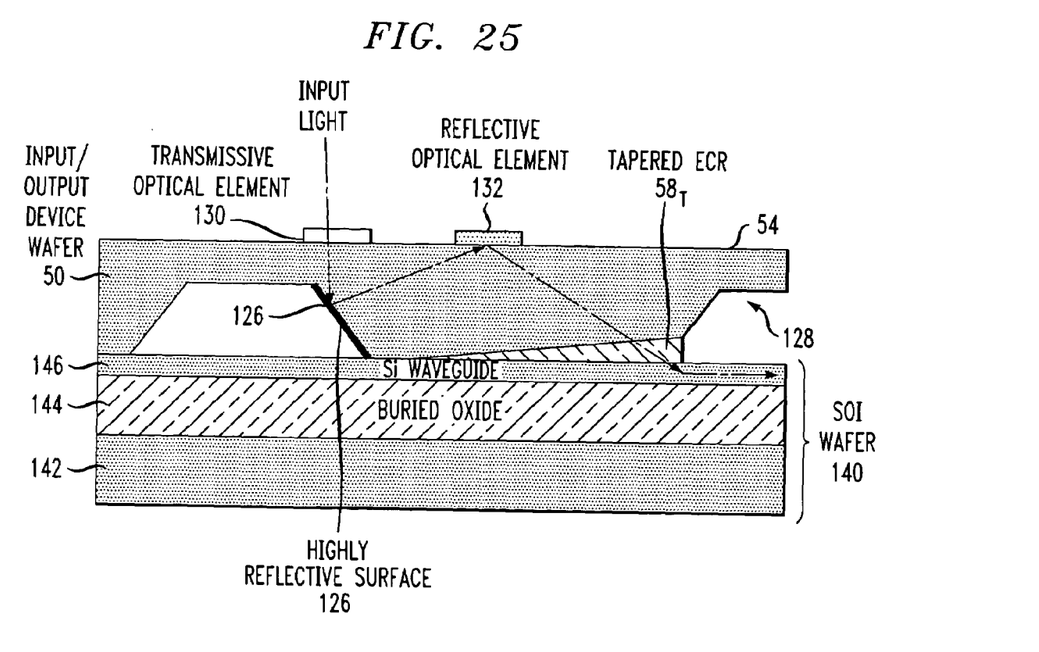
Figure 26:
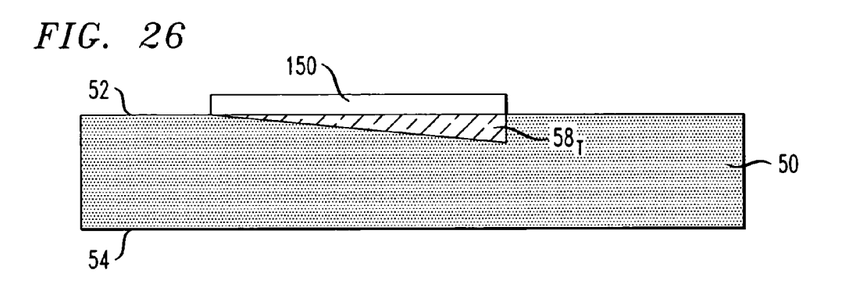
FIGS. 26–29 illustrate another processing sequence of the present invention, using a transmissive optical element to directly steer an incoming optical beam into the tapered evanescent coupling region without the need for a separate optical coupling facet.

FIGS. 24 and 25 illustrate an alternative to the process illustrated in FIGS. 19–23, where an additional reflective optical element 132 is disposed on major surface 54 of optical coupling substrate. Referring to FIG. 24, optical substrate 50 is shown as including both transmissive optical element 130 (such as a lens) and a reflective optical element 132 (such as a mirrored surface), thus providing an internal reflection of the optical signal prior to the signal reaching tapered evanescent coupling region $58_T$. FIG. 25 illustrates the complete arrangement, illustrating the joining of optical coupling substrate 50 and SOI wafer 140. Referring to FIG. 25, it is shown how an input optical signal O passes through transmissive optical element 130, reflects off of angled surface 126 and then impinges reflective optical element 132. The reflected optical signal is then directed into tapered evanescent coupling region $58_T$ at a desired angle determined to be optimum for coupling light into an underlying silicon optical waveguide layer 146.

Figure 27:
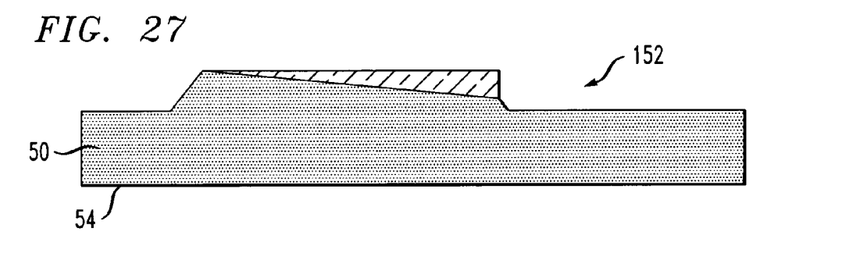

FIGS. 26–29 illustrate yet another processing embodiment of the present invention, again utilizing the processing steps of FIGS. 4–7 to form optical coupling substrate 50 including tapered evanescent coupling region $58_T$. In this embodiment a transmissive optical element is utilized, as illustrated below, to steer the incoming optical signal directly into tapered evanescent coupling region $58_T$. For example, an optical grating may be written into bottom major surface 54. In this example, the process begins with optical coupling substrate 50 and tapered evanescent coupling region $58_T$ formed as discussed above with FIGS. 4–7. For this process embodiment, a mask 150 is deposited on top major surface 52 of substrate 50 to cover and protect tapered evanescent coupling region $58_T$. Thereafter, the exposed regions of top major surface 52 are subjected to a wet chemical etch, as shown in FIG. 27, to form cavity regions 152. As discussed above with the other embodiments, cavity regions 152 are used to block the re-coupling of the propagating optical signal back into substrate 50 from the silicon optical waveguide layer of the SOI wafer.

Figure 28:
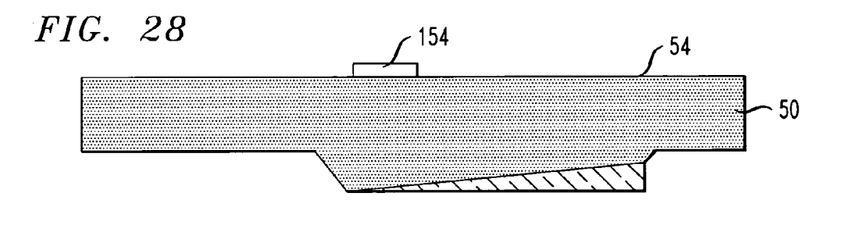
Figure 29:
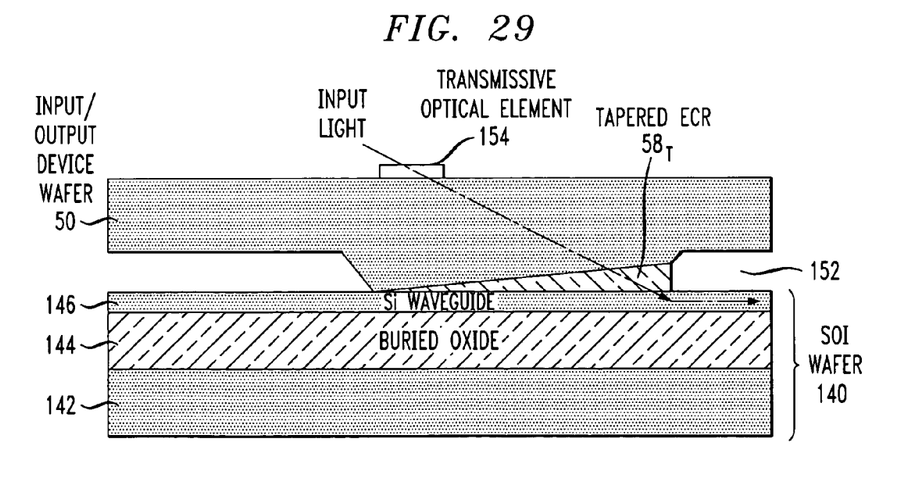

FIG. 28 illustrates the next step in this particular process, where substrate 50 is inverted and a beam steering transmissive optical element 154 is disposed at a predetermined location along bottom major surface 54 of substrate 50. The final device structure is illustrated in FIG. 29, which illustrates the re-direction of an input optical signal O by beam steering transmissive optical element 154 into tapered evanescent coupling region $58_T$. Thus, by using the beam steering feature, there is no need to perform additional etching to form an angled facet coupling surface, as required for all of the embodiments described above.

It is to be noted that for each of the various embodiments discussed above, the conventional semiconductor process-based sub-micron alignment tolerances between the coupling substrate and the SOI wafer are retained, whether joining and alignment occurs at the wafer level or die level. Indeed, to physically attach the coupling substrate to the processed SOI wafer (i.e., an SOI wafer including a waveguide layer), processes similar to those described in the prior art may be used. That is, conventional attachment/bonding processes have been found sufficient to provide a permanent bond between an optical coupling substrate and the SOI waveguide layer. For example, the coupler and SOI wafer may be pressed together and fused at a high temperature to form a permanent physical bond. Alternatively, a low temperature bonding process may be used. The use of a low temperature process permits the incorporation of device structures within the SOI wafer that cannot withstand elevated temperatures. One exemplary process uses chemically activated surfaces on both the optical coupling substrate and SOI wafer, allowing for low temperature bonding at a relatively moderate applied pressure. The bonding chemistry must be compatible with the materials used in the SOI wafer and coupling substrate. Examples include, but are not limited to, compatibility with various integrated circuit metallization systems and/or AR coating materials. Regardless of the materials or processes used to attach the optical coupling substrate to the SOI wafer, the actual attachment must be sufficient to withstand dicing/sawing operations used to separate the various structures formed on a single wafer. Moreover, the attachment process should not cause any electrostatic damage to any active components on the SOI wafer. Another advantage of the semiconductor-based bonding process is the alignment accuracy that can be achieved between the two bonded substrates using integrated circuit manufacturing infrastructures. For example, alignment accuracies better than ±1 μm can be routinely achieved using commercially available tools. It should be further noted that both the coupling substrate and SOI wafer will include alignment features, as well-known and used in the art, to perform the alignment required for the intended application.

Although the present invention has been shown and described with respect to several preferred embodiments, it is to be understood that various changes in form and detail are considered to fall within the spirit and scope of the invention as defined by the claims appended hereto.

What is claimed is:

1. A method of forming a tapered evanescent coupling region for use with a relatively thin silicon optical waveguide layer, the method comprising the steps of:
   a) providing a polished silicon substrate including a top major surface and an opposing bottom major surface;
   b) depositing a photoresist material across the top major surface of the silicon substrate provided in step a);
   c) patterning said photoresist surface to define a tapered area of photo resist material;
   d) etching the patterned surface to transfer the tapered pattern from the photoresist into the underlying silicon substrate material, forming a tapered opening in the silicon substrate; and
   e) filling the tapered opening with a material exhibiting a lower refractive index than the silicon substrate, said filled region defining the tapered evanescent coupling region.

2. The method as defined in claim 1 wherein in performing step a), a silicon substrate having a <100> oriented crystallographic surface is provided.

3. The method as defined in claim 1 wherein in performing step a), a silicon substrate having a refractive index greater than or equal to the refractive index of the silicon waveguide is provided.

4. The method as defined in claim 1 wherein in performing step c), gray-scale lithography is used to form the tapered area of photoresist material.

5. The method as defined in claim 1 wherein the method further comprises the steps of:
   f) depositing a photoresist material across the bottom major surface of the silicon substrate;
   g) patterning said photoresist surface to define locations of optical coupling facets;
   h) etching said patterned surface to form optical coupling facets through the bottom major surface of the silicon substrate.

6. The method as defined in claim 5 wherein an anisotropic wet chemical etch is used in the etching process of step h).

7. The method as defined in claim 5 wherein the etching process of step h) continues through the extent of the silicon substrate to the top major surface, forming prism couplers exhibiting optical coupling facets.

8. The method as defined in claim 7 wherein the through-etching of the silicon substrate further forms optical cavity regions, an edge of an optical cavity region formed to align with the thickest portion of the tapered evanescent coupling region.

9. The method as defined in claim 5 wherein the etching process of step h) is halted prior to reaching the silicon substrate top major surface, forming V-grooves as optical coupling facets.

10. The method as defined in claim 9 wherein the method further comprises the steps of:
    i) patterning the top major surface of the silicon substrate to define locations of optical cavity regions;
    j) etching the patterned top major surface to remove a predetermined portion of the exposed substrate material and form the optical cavity regions.

11. The method as defined in claim 5 wherein the method further comprises the step of:
    k) coating the etched bottom major surface of the silicon substrate with an anti-reflective coating.

12. The method as defined in claim 11 wherein silicon nitride is used as the anti-reflective coating.

13. The method as defined in claim 1 wherein the method further comprises the steps of:
    l) depositing a photoresist material across the top major surface of the silicon substrate;
    m) patterning said photoresist surface to define locations of optical coupling facets with respect to the location of the tapered evanescent coupling region;
    n) etching said patterned surface to form optical coupling facets through the top major surface of the silicon substrate.

14. The method as defined in claim 13 wherein the method further comprises the step of:
    o) coating the exposed optical coupling facets with a reflective material.

15. The method as defined in claim 13 wherein the method further comprises the step of:
    p) disposing at least one transmissive optical element on the bottom major surface of the silicon substrate in alignment with the optical coupling facet such that an optical signal passing through the at least one transmissive optical element will be redirected by the optical coupling facet into the tapered evanescent coupling region.

16. The method as defined in claim 13 wherein the method further comprises the step of:
    q) disposing at least one reflective optical element on the bottom major surface of the silicon substrate in alignment with both the tapered evanescent coupling region and the optical coupling facet such that an optical signal reflected from the optical coupling facet will impinge the at least one reflective optical element and be redirected into the tapered evanescent coupling region.

17. The method as defined in claim 1 wherein the method further comprises the step of:
    r) joining the silicon substrate to a semiconductor wafer containing a surface silicon optical waveguide layer, the silicon substrate joined to the semiconductor wafer such that the tapered evanescent coupling region is disposed directly above, and coupled to, the surface silicon optical waveguide layer.

18. The method as defined in claim 17 wherein the semiconductor wafer comprises an SOI wafer including a silicon substrate, a buried oxide layer disposed above the silicon substrate, and the surface silicon optical waveguide layer disposed above the buried oxide layer.

19. The method as defined in claim 1 wherein in performing step e) silicon dioxide is used to fill the tapered opening in the top major surface of the silicon substrate.

20. The method as defined in claim 1 wherein in performing step e) silicon nitride is used to fill the tapered opening in the top major surface of the silicon substrate.

* * * * *